United States Patent
Ikai (10) Patent No.: US 6,839,307 B2
(45) Date of Patent: Jan. 4, 2005

(54) APPARATUS FOR RECORDING INFORMATION AND METHOD FOR RETRACTING THE HEAD

(75) Inventor: Yoshiaki Ikai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 294 days.

(21) Appl. No.: 10/121,818

(22) Filed: Apr. 12, 2002

(65) Prior Publication Data

US 2003/0123342 A1 Jul. 3, 2003

(30) Foreign Application Priority Data

Dec. 28, 2001 (JP) ........................................ 2001-399596

(51) Int. Cl.[7] ............................................... G11B 7/00
(52) U.S. Cl. ............................... 369/44.14; 369/44.27; 369/44.32; 369/53.12
(58) Field of Search .......................... 369/44.14, 44.27, 369/44.32, 47.1, 53.1, 53.12, 53.18, 53.32; 360/69, 75, 105, 103, 78.04

(56) References Cited

U.S. PATENT DOCUMENTS

| 5,633,568 A | * | 5/1997 | Dunfield .................. 360/75 |
| 5,729,399 A | * | 3/1998 | Albrecht et al. ............... 360/75 |
| 6,219,221 B1 | * | 4/2001 | Kibi et al. ................... 361/502 |
| 6,301,082 B1 | | 10/2001 | Sonderegger et al. ..... 360/266.2 |
| 6,490,116 B1 | * | 12/2002 | Watanabe et al. ............. 360/75 |
| 6,594,102 B1 | * | 7/2003 | Kanda et al. ................. 360/75 |

FOREIGN PATENT DOCUMENTS

JP 4-32029 2/1992

* cited by examiner

Primary Examiner—Muhammad Edun
(74) Attorney, Agent, or Firm—Greer, Burns & Grain, Ltd.

(57) ABSTRACT

The invention relates to an information recording apparatus including a head that is disposed so as to face a recording medium, and records information in the recording medium and/or reproduces information therefrom, and a head actuator for moving the head toward and away from the recording medium. The apparatus further comprises a capacitor electrically charged by a power source; and a driving processor for driving the head actuator with electric charge accumulated in the capacitor in accordance with a voltage of the power source, and for retracting the head to a position away from the recording medium.

10 Claims, 5 Drawing Sheets

APPARATUS FOR RECORDING INFORMATION AND METHOD FOR RETRACTING THE HEAD

BACKGROUND OF THE INVENTION

1. Field of the Invention

The present invention relates to an apparatus for recording information and a method for retracting the head, in particular, an information recording apparatus for recording and/or reproducing by moving the head with respect to a recording medium, and a method for retracting the head.

2. Description of the Prior Art

In prior art optomagnetic disk devices, a distance between an object lens and a disk at the focused position, that is, a working distance of approx. 1 mm has been secured. Therefore, the distance had comparatively sufficient allowance, wherein since a stopper mechanism could be provided between the object lens and the disk, it was possible to physically prevent both of these from being brought into contact with each other. Therefore, it was not necessary for the object lens to be retracted from the disk to a position separated therefrom.

Figure 1:
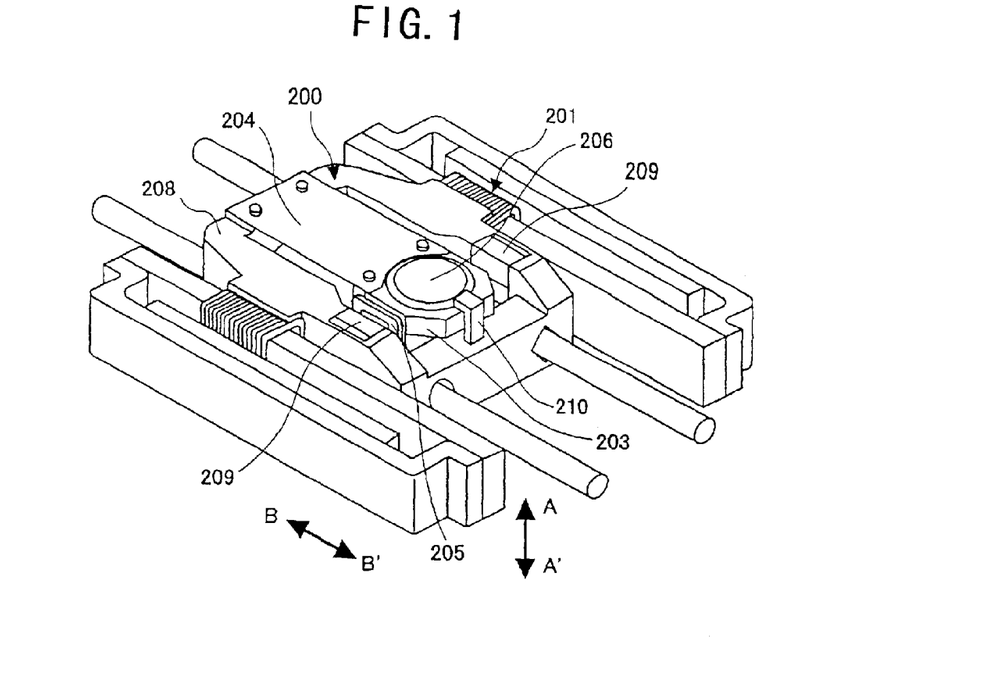
FIG. 1 is a perspective view of one example of an optical pickup of a prior art optical disk apparatus.
Figure 2:
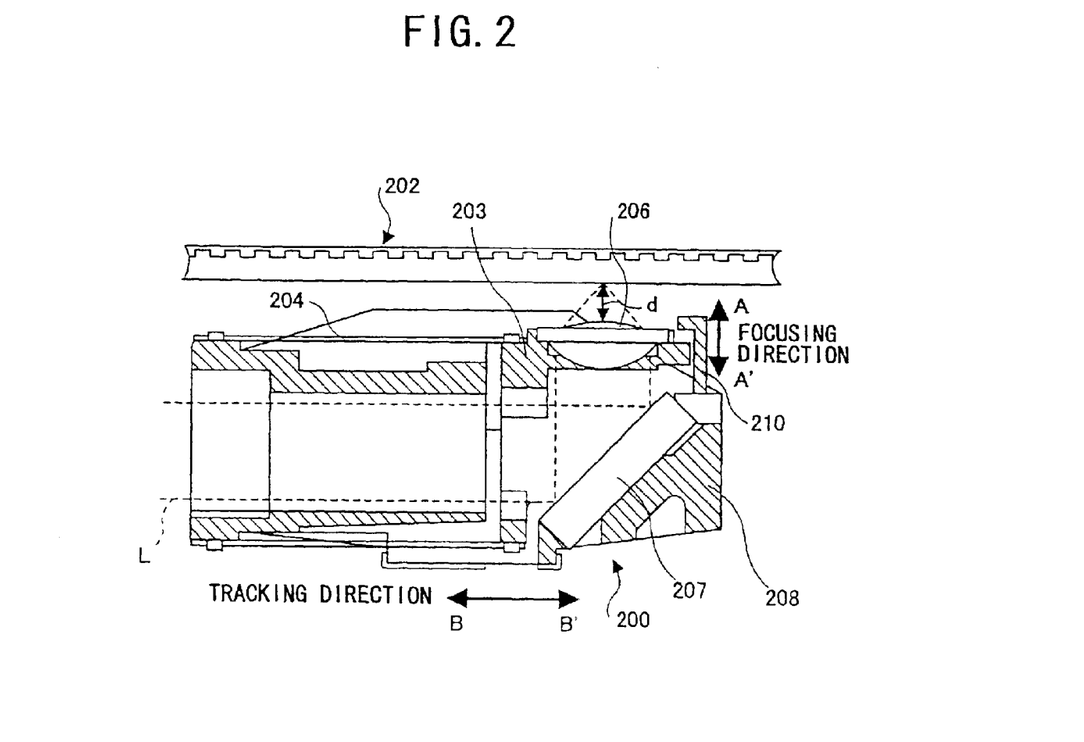
FIG. 2 is a sectional view of one example of the optical pickup of the prior art optical disk apparatus.

FIG. 1 is a perspective view showing one example of a movable head of a prior art optical disk device, and FIG. 2 is a sectional view showing one example of a movable head of a prior art optical disk device.

The movable head 200 is caused to be movable in the directions of the arrows B–B', that is, in the diametrical directions of an optical disk 202 by a voice coil motor 201.

The movable head 200 is composed so as to include a lens holder 203, a plate spring 204, a focus coil 205, an object lens 206, an erect mirror 207, a movable head body 208, and a permanent magnet 209. The object lens 206 is fixed on the lens holder 203. Also, the lens holder 203 is fixed on the movable head body 208 via the plate spring 204 and is caused to be swingable in the directions of the arrows A–A' with respect to the movable head body 208. The focus coil 205 is attached to the side of the lens holder 203. The permanent magnet 209 is fixed on the side of the movable head body 208, which faces the focus coil 205.

As a drive current is caused to flow into the focus coil 205, a current flowing in the focus coil 205 and a magnetic field that is generated by the permanent magnet 209 interact with each other, wherein a force is generated at the focus coil 205, and it is possible to cause the lens holder 203 to sway in the directions of the arrows A–A' by an electromagnetic force acting on the focus coil 205. Since the lens holder 203 is caused to sway in the directions of the arrows A–A', the object lens 206 is accordingly caused to sway in the directions of the arrows A–A', thereby enabling focusing.

Also, the erect mirror 207 is disposed under the object lens 206 of the movable head body 208 and is fixed on the movable head body 208. A light beam L is made incident from a fixed head (not illustrated) into the erect mirror 207. The erect mirror 207 reflects the light beam L input from the fixed head to the direction of the object lens 206, that is, to the direction of the arrow A. The light beam L reflected by the erect mirror 207 is provided into the object lens 206. The object lens 206 converges the light beam L from the erect mirror 207 and provides the same to the optical disk 202.

The light beam L that is provided into the optical disk 202 is reflected by the optical disk 202, and is provided to the erect mirror 207 through the object lens 206 again. The erect mirror 207 reflects the light beam L input from the object lens 206 to the direction of the fixed head, that is, the direction of the arrow B.

At this time, in order to prevent the object lens 206 and the disk 202 from colliding with each other due to an impact applied from the outside, a stopper mechanism 210 that controls movement of the lens holder 203 in the direction of the arrow A is provided.

In order to provide the stopper mechanism 210, it is generally necessary to secure a working distance d of 0.5 mm or the like in the worst case to absorb a dimensional error of components and an assembling error of the apparatus. However, recently, it has been requested that the diameter of the light beam L be made smaller in line with an increase in the recording density of the disk 202. In order to achieve a smaller diameter of the light beam L, it is necessary that the working distance d be made smaller. However, as the working distance d becomes smaller, there may caused a possibility for the disk 202 and the object lens 206 to collide with each other due to a facial swaying of the disk 202.

Therefore, without depending on the stopper mechanism 210, it is necessary to provide a mechanism for retracting the object lens 206 by using auxiliary power.

As a method for retracting the object lens 206 by using auxiliary power without depending on the stopper mechanism 210, some methods have been taken into consideration, one of which is a method for employing a battery driven by a chemical reaction as auxiliary power for retraction, and the other of which is a method for employing a back electromotive force of a motor due to inertia rotations of a disk as auxiliary power as in Japanese Unexamined Patent Application No. 1992-32029.

However, the life cycle of charging and discharging is shortened to be several hundred times where, in order to secure retraction power, a battery employing chemical reaction such as a lithium ion battery is provided. Also, there is another problem in that a longer period of time is required to charge the battery. Therefore, it is unsuitable to use a battery employing chemical reaction as power for retraction of an optical disk device.

Further, as in Japanese Unexamined Patent Application 1992-32029, in the method for utilizing a back electromotive force of a motor, which is induced by inertia rotations of a disk, as power for retraction, voltage that can be picked up depends on the number of revolutions of the disk. That is, although a high voltage can be picked up where the disk is rotating at a high speed, only a low voltage can be obtained where the disk is rotating at a low speed, wherein another problem arises in that sufficient power for retraction cannot be provided to an actuator.

Usually, since the surface of the disk is not completely flat but is distorted in the range of several tens of micrometers to several hundreds of micrometers, the lens actuator always repeats up and down movements and focuses with respect to the rotating disk. Therefore, unless a sufficient retraction current is caused to flow, there is a danger that the lens may be brought into collision with the disk due to inertia. Also, where an impact is provided from the outside during the retraction, an adequate acceleration rate is not provided to stand against the impact, and there may be a danger of a collision.

SUMMARY OF THE INVENTION

The present invention was developed in view of the above-described and other situations, and it is therefore an object of the invention to provide an apparatus for recording and/or reproducing information, and a method for retracting the head, and a circuit for retracting the head, by which the head can be securely retracted from a recording medium.

The present invention is characterized in that electric power is accumulated in a capacitor, and a head actuator for moving and retracting the head is driven by the power accumulated in the capacitor.

According to the invention, since the head is retracted by the electric power accumulated in the capacitor, the charging and control thereof can be further facilitated with a chemical battery as a secondary battery, and sufficient durability can be secured with respect to repeated charging and discharging of the battery. Further, it is possible to securely retract the head without depending on the status of the charging system.

Also, the invention is characterized in that a first head actuator for moving the head in the direction toward a recording medium is driven by electric power accumulated in a capacitor, and a second head actuator for moving the head in parallel to the plane or surface of the recording medium is driven with a delay of a designated duration of time.

According to the invention, since a retraction action is carried out by the second haed actuator for moving the head in the direction along which a recording medium extends with delay after the retraction action of the first head actuator for moving the head in the direction toward the recording medium, when trouble occurs, the first head actuator is first driven with maximum power that can be applied by a capacitor, and the head can be quickly separated from the recording medium.

The invention is characterized in that the capacitor is an electric double-layer capacitor.

According to the invention, since the electric double-layer capacitor has a large capacity, it is possible to apply sufficient power to the head actuator with respect to a retraction action.

As described above, according to the present invention, since the head is retracted by the electric power accumulated in the capacitor, the charging and control thereof can be further facilitated with a chemical battery as a secondary battery, and sufficient durability can be secured with respect to repeated charging and discharging of the battery. Further, the invention has a feature in that it is possible to securely retract the head without depending on the status of the charging system.

Also, according to the invention, since a retraction action is carried out by the second head actuator for moving the head in the direction along which a recording medium extends with delay after the retraction action of the first head actuator for moving the head in the direction toward the recording medium, when trouble occurs, the first head actuator is first driven with maximum power that can be applied by a capacitor, and the head can be quickly separated from the recording medium. Therefore, the invention has a feature in that it is possible to securely prevent the head from being brought into collision with a recording medium.

Still further, according to the invention, since the electric double-layer capacitor has a large capacity, it is possible to apply sufficient power to the first head actuator with respect to a retraction action. Therefore, the invention has a feature in that the head can be securely retracted.

DETAILED DESCRIPTION OF THE PREFERRED EMBODIMENTS

Figure 3:
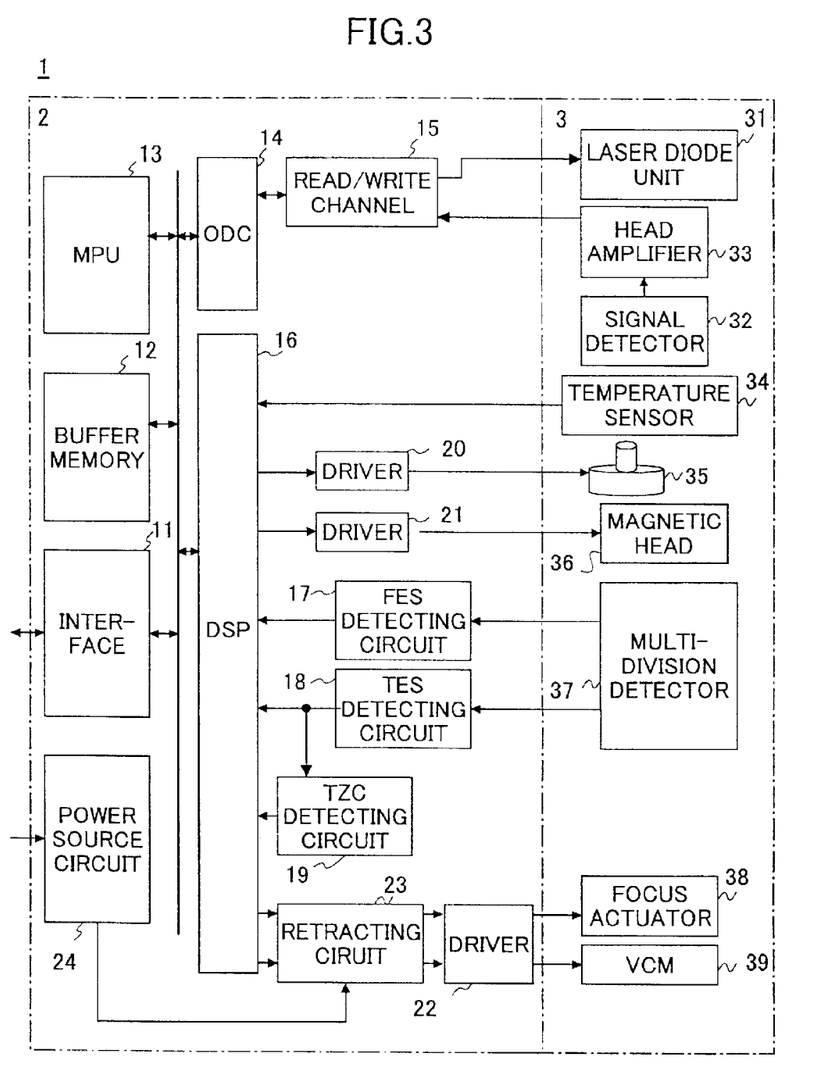
FIG. 3 is a block configurational view of one embodiment of an optical disk apparatus according to the present invention.

FIG. 3 shows a block configuration of one embodiment of an optical disk apparatus according to the present invention.

An optical disk apparatus 1 according to the present embodiment is mainly composed of a control unit 2 and a disk enclosure 3. Also, since the configuration of the head is roughly the same as that of a prior art head shown in FIG. 1 and FIG. 2, description thereof is omitted. However, in the present embodiment, a stopper mechanism 210 is no longer required.

The control unit 2 is constructed so as to include an interface 11, a buffer memory 12, a micro-processing unit (MPU) 13, an optical disk controller 14, a READ/WRITE channel 15, a digital signal processor (DSP) 16, a focus error signal detecting circuit 17, a tracking error signal detecting circuit 18, a zero cross detecting circuit 19, drivers 20 through 22, and a retraction circuit 23. Also, the enclosure 3 is constructed so as to include a laser diode unit 31, an ID/MO signal detector 32, a head amplifier 33, a temperature sensor 34, a spindle motor 35, a magnetic head 36, a multi-division detector 37, a focus actuator 38, and a voice coil motor 39.

In addition, the focus actuator 38 corresponds to the first moving means, and is composed of a focus coil 205 and a permanent magnet 209, which are shown in FIG. 1 and FIG. 2.

The interface 11 of the control unit 2 is used to secure interface with an upper-graded device, and the buffer memory 12 is used to buffer data that are received and transmitted with respect to the upper-graded device. The MPU 13 is used to control the entire action.

The optical disk controller 14 controls the READ/WRITE channel 15. The READ/WRITE channel 15 modulates WRITE data and demodulates READ data.

The laser diode unit 31 emits laser light. Light that is emitted from the laser diode unit 31 is irradiated onto an optical disk, passing through an optical system.

The light irradiated onto the optical disk is reflected from the optical disk and is provided to the ID/MO signal detector 32 and the multi-division detector 37. The ID/MO signal detector 32 detects the ID/MO signal components from the light reflected from the optical disk, and provides the detected ID/MO signals to the head amplifiers 33. The head amplifier 33 amplifies the ID/MO signals and provides the same to the READ/WRITE channel 15. The READ/WRITE channel 15 demodulates control information and data from the ID/MO signals. The data that are demodulated by the READ/WRITE channel 15 are stored in the buffer memory 12.

The multi-division detector 37 is divided into an area for detecting focus error signals and an area for detecting tracking error signals. Signals that are detected by the area for detecting focus error signals of the multi-division detector 37 are provided into the focus error signal detecting circuit 17, and the focus error signal detecting circuit 17 generates focus error signals on the basis of the detection signals from the area for detecting focus error signals of the multi-division detector 37.

The focus error signals that are generated by the focus error signal detecting circuit 17 are provided into the DSP 16. The DSP 16 generates focus servo signals on the basis of the focus error signals that have been generated by the focus error detecting circuit 17, and provides the same to the retraction circuit 23. The retraction circuit 23 corresponds to retracting means described in the Claims, and the retraction circuit 23 provides focus servo signals from the DSP 16 to the driver 22 in normal operations, and carries out a changeover operation so that, when any trouble occurs, a retraction signal for retracting the object lens is provided to the driver 22. Also, a detailed description is given later of the retraction circuit 23.

The driver 22 provides, in normal operations, a drive current to the focus actuator 38 on the basis of the focus servo signals that are provided from the DSP 16 through the retraction circuit 23. The focus actuator 38 causes the object lens to move in the focusing direction, that is, the directions of the arrows A–A' shown in FIG. 1 and FIG. 2, on the basis of the drive current from the driver 22. Since the object lens is moved in the focusing direction, light emitted from the laser diode unit 31 is focused on an optical disk. In addition, when the drive current is provided from the driver 22 on the basis of a retraction signal from the retraction circuit, the focus actuator 38 causes the lens holder 203 to move in a direction of separating from the optical disk, that is, the direction of the arrow A showed in FIG. 1 and FIG. 2, and causes the object lens 206 to be retracted to a position separated from the optical disk.

Further, the detection signal that is detected by the area for detecting a tracking error signal of the multi-division detector 37 is provided to the tracking error signal detecting circuit 18. The tracking error signal detecting circuit 18 generates a tracking error signal on the basis of the detection signal from the area for detecting a tracking error signal of the multi-division detector 37. The tracking error signal that is detected by the tracking error signal circuit 18 is provided to the DSP 16 and the tracking zero cross signal detecting circuit 19. The DSP 16 generates a tracking error signal or a voice coil motor control signal on the basis of a seek signal and provides the same to the retraction circuit 23. In normal operations, the retraction circuit 23 provides the voice coil motor control signal from the DSP 16 to the driver 22, and, in abnormal operations, carries out a changeover operation so that a retraction signal to retract the carriage is provided to the driver 22. Also, a detailed description is given later of the retraction circuit 23.

The driver 22 provides a drive current to the voice coil motor 39 on the basis of the voice coil motor control signal from the retraction circuit 23 or a retraction signal therefrom. The voice coil motor 39 is a positioner that concurrently operates as a seek control actuator and a tracking control actuator, which is driven on the basis of the drive current from the driver 22, wherein the head is caused to move in the radius direction of an optical disk, that is, the cross direction of tracking or the directions of the arrows B–B' shown in FIG. 1 and FIG. 2, and seek control and tracking control or retraction control are carried out. In addition, the voice coil motor 39 causes the movable head 200 to move to the end portion in either of the direction of the arrow B or the direction of the arrow B, that is, the retraction position when a drive current is provided from the driver 22 by the retraction signal from the retraction circuit 23.

Also, the MPU 13 generates a spindle motor control signal on the basis of the ID/MO signal that is reproduced from the optical disk, and provides the same to the driver 22 through the DSP 16. The driver 22 causes the spindle motor 35 to turn on the basis of the spindle motor control signal from the DSP 16.

Also, a temperature detecting signal from the temperature sensor 34 is provided to the MPU 13 through the DSP 16. The temperature sensor 34 detects the temperature in the disk enclosure 3. The MPU 13 generates a bias magnetic field control signal on the basis of the temperature detection signal from the temperature sensor 34, and provides the same to the driver 21 via the DSP 16. The driver 21 provides a current to the magnetic head 36 on the basis of the bias magnetic field control signal from the MPU 13. The magnetic head 36 generates a magnetic field on the basis of the current from the driver 21. At this time, the bias magnetic field is controlled in response to the temperature detected by the temperature sensor 34, thereby enabling the optimal READ/WRITE.

A detailed description is given below of the retraction circuit 23.

Figure 4:
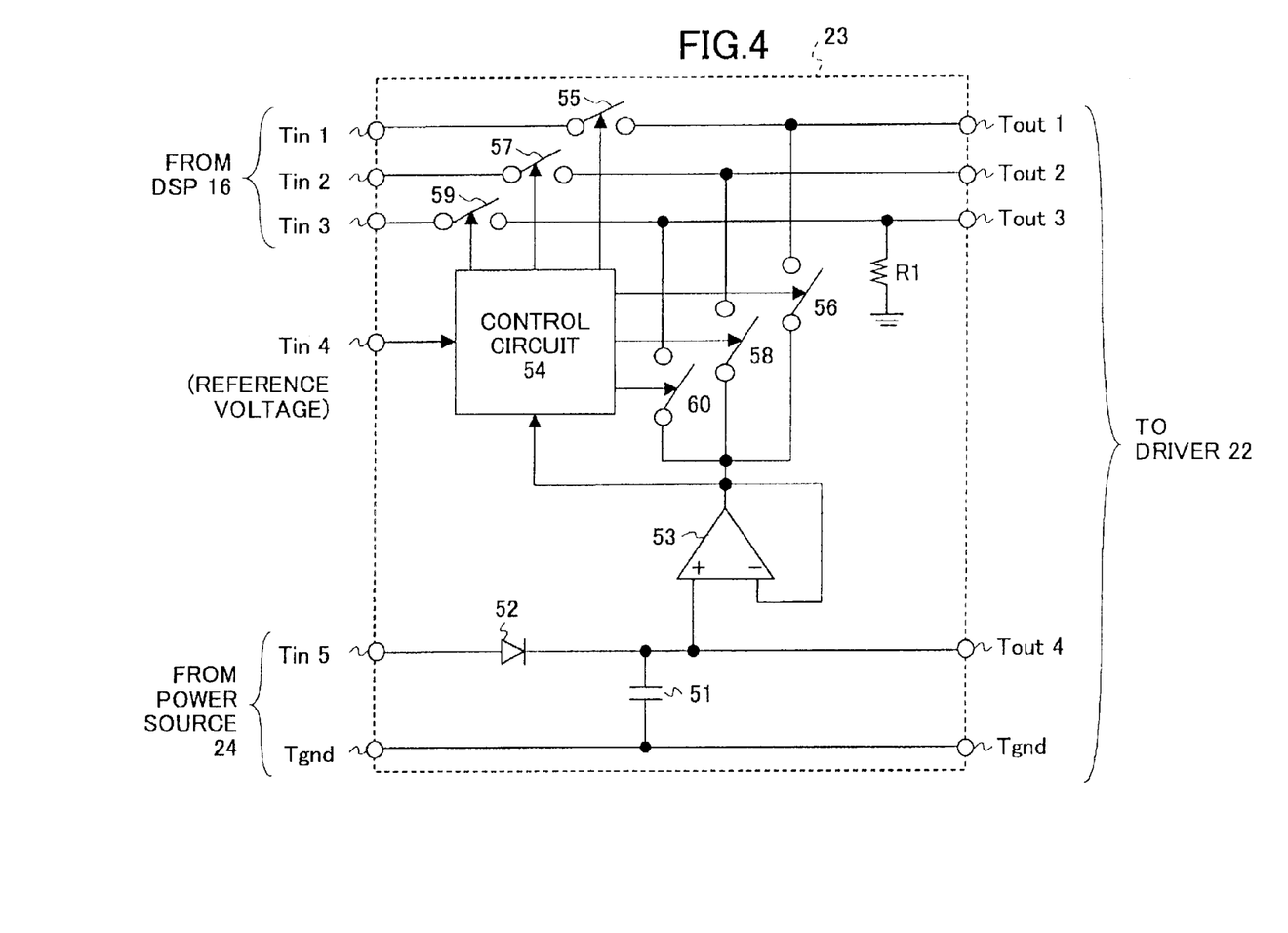
FIG. 4 is a block configurational view of a retraction circuit 23 of FIG. 3.

FIG. 4 is a block configurational view of the retraction circuit 23.

The retraction circuit 23 includes a capacitor 51, a diode 52, a voltage follower circuit 53, a control circuit 54, analog switches 55 through 60, and a resistor R1. Also, the retraction circuit 23 has input terminals Tin1 through Tin5, a grounding terminal Tgnd, and output terminals Tout1 through Tout4. A mute signal from the DSP 16 is provided to the input terminal Tin1 that is connected to the output terminal Tout1 via the analog switch 55.

A focus servo signal is provided from the DSP 16 to the input terminal Tin2. The input terminal Tin2 is connected to the output terminal Tout2 via the analog switch 57.

A voice coil motor control signal is provided from the DSP 16 to the input terminal Tin3. The input terminal Tin3 is connected to the output terminal Tout3 via the analog switch 59.

A reference voltage that is generated by a reference voltage generating circuit (not illustrated) is provided into the input terminal Tin4. The reference voltage that has been provided to the input terminal Tin4 is further provided to the control circuit 54.

A drive power source voltage is applied from the power circuit 24 to the input terminal Tin5. The drive power source voltage provided to the input terminal Tin5 is provided to the output terminal Tout4 and to one end of the capacitor 51 via the diode 52. The output terminal Tout4 is connected to the driver 22, thereby providing a drive current to the driver 22.

The grounding terminal Tgnd is grounded outside the retraction circuit 23, wherein the other end of the capacitor 51 is connected to the grounding terminal Tgnd inside the retraction circuit 23.

The capacitor 51 is composed of, for example, an electric double-layer capacitor. The electric double-layer capacitor is capable of storing 0.1 F (Farads) even in a small size and storing a remarkably large electric charge equivalent to several thousands of Farads. The electric double-layer capacitor is featured in that charging thereof is enabled in several seconds since there is no accompanying chemical reaction as in normal capacitors, and charging and discharging are made possible with almost no limitation. Also, a detailed framework and types of the electric double-layer capacitor are described in "Electric double-layer capacitor and electricity accumulation system" prepared by Michio Okamura and issued by Nikkan Kogyo Shimbunsha.

One end of the capacitor 51 is connected to the power source terminal Tin5 via the output terminal Tout4 and diode 52. The power source terminal Tin5 is connected to the power source circuit 24. A power source voltage is applied from the power source circuit 24 to the power source terminal Tin5.

The power source voltage applied to the power source terminal Tin5 is applied to one end of the capacitor and the output terminal Tout4 via the diode 52. The capacitor 51 is charged by the power source voltage that is applied from the power source terminal Tin5 via the diode 52. The diode 52 is connected so that the direction from the power source terminal Tin5 toward the capacitor 51 becomes a forward direction, wherein, when the power source voltage applied to the power source terminal Tin5 is lowered, the electric charge in the capacitor 51 is prevented from an inverted flow to the power source circuit 24.

When the voltage applied from the power source circuit 24 to the power source terminal Tin5 is lowered by cutoff of power source, the electric charge accumulated in the capacitor 51 is provided to the terminal Tout4 and voltage follower circuit 53. The voltage follower circuit 53 outputs an output signal responsive to the voltage at one end of the capacitor 51. The output signal of the voltage follower circuit 53 is provided to the control circuit 54 and analog switches 56, 58 and 60.

The control circuit 54 switches the analog switches 55 through 60 on the basis of comparison results of the output signals of the voltage follower circuit 53 with the reference voltage that is provided to the input terminal Tin4.

Figure 5:
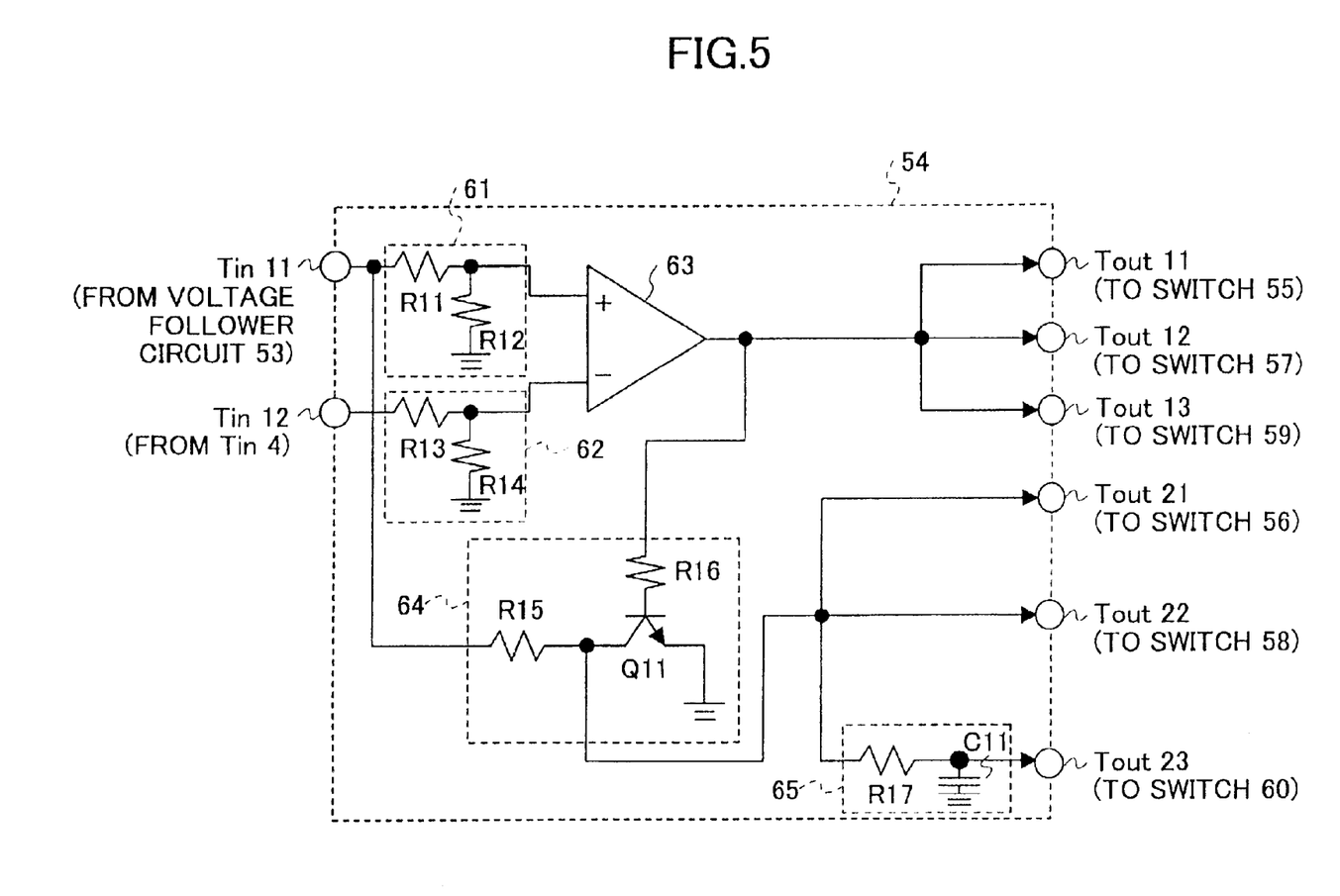
FIG. 5 is a block configurational view of a control circuit 54 of FIG. 4.

FIG. 5 is a configurational view of the control circuit 54.

The control circuit 54 includes input circuits 61 and 62, a comparator 63, a NOT circuit 64 and a delay circuit 65. An output signal of the voltage follower circuit 53 is provided from the input terminal Tin 11 to the input circuit 61. The input circuit 61 is composed of a resistor R11 and a resistor R12, and the output signal of the voltage follower circuit 53 is divided in terms of voltage by the resistors R11 and R12 and is provided to a non-inverting input terminal of comparator 63.

The reference voltage from the input terminal Tin4 is provided to the input circuit 62 by the input terminal Tin12. The input circuit 62 is composed of resistors R13 and R14, wherein the reference voltage is divided by the resistors R13 and R14 and is provided to the inverting input terminal of comparator 63.

The comparator 63 compares the output voltage of the input circuit 61 with the output voltage of the input circuit 62. When the output voltage of the input circuit 61 becomes larger than that of the input circuit 62, the comparator 63 makes the output HIGH. And, the comparator 63 makes the output LOW when the output voltage of the input circuit 61 is lower than that of the input circuit 62, that is, when the voltage at one end of the capacitor 51 is made lower than an appointed voltage. The output of the comparator 63 is made HIGH when the output voltage of the power source circuit 24 is larger than an appointed voltage and is made LOW when the output voltage of the power source circuit 24 is smaller than the appointed voltage and when the voltage at one end of the capacitor 51 is made smaller than the appointed voltage. Also, the outputs of the comparator 63 are provided to the output terminals Tout11 through Tout13 and the NOT circuit 64.

The NOT circuit 64 is composed of resistors R15 and R16 and a transistor Q11. The NOT circuit 64 is driven by voltage of the input terminal Tin11 and inverts the output of the comparator 63. The output of the NOT circuit 64 is provided to output terminals Tout21 and Tout22, and is further provided to an output terminal Tout23 via the delay circuit 65.

The delay circuit 65 is composed of a resistor R17 and a capacitor C11, and the same delay circuit 65 delays the output of the NOT circuit 64 by time responsive to a time constant that is determined by the resistor R17 and capacitor C11, and provides the same output to the output terminal Tout23.

The output terminal Tout11 of the control circuit 54 is connected to a switching control terminal of the analog switch 55. The output terminal Tout12 of the control circuit 54 is connected to the switching control terminal of the analog switch 57. The output terminal Tout13 of the control circuit 54 is connected to the switching control terminal of the analog switch 59. The analog switches 55, 57 and 59 are turned on when the output terminals Tout11 through Tout13, respectively, of the control circuit 54 are HIGH, and are turned off when these are LOW.

Further, an output terminal Tout21 of the control circuit 54 is connected to the switching control terminal of the analog switch 56. An output terminal Tout22 of the control circuit 54 is connected to the switching control terminal of the analog switch 58. An output terminal Tout23 of the control circuit 54 is connected to the switching control terminal of the analog switch 60. The analog switches 56 and 58 are turned on when the output terminals Tout21 and Tout23, respectively, of the control circuit 54 are HIGH, and are turned off when these are LOW. The analog switch 60 is turned on in an appointed duration of time after the control terminal Tout23 becomes HIGH.

Next, a description is given of operations of the retraction circuit 23.

Figure 6:
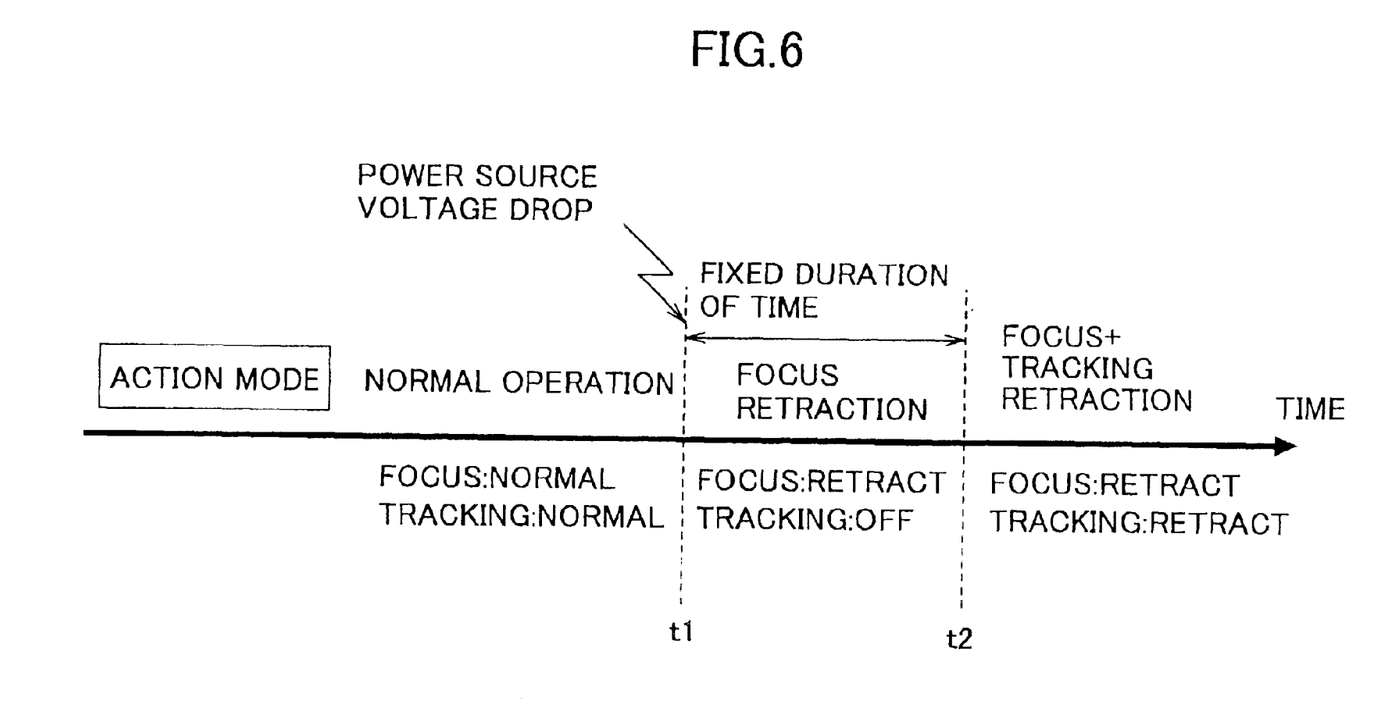
FIG. 6 is a view describing a retraction action of the retraction circuit 23 of FIG. 3.

FIG. 6 is a view describing the operations of the retraction circuit 23.

When the power source voltage from the power source circuit 24 is a normal voltage, the control circuit 54 turns on the analog switches 55, 57 and 59 and turns off the analog switches 56, 58 and 60. Since the analog switches 55, 57 and 59 are turned on and the analog switches 56, 58 and 60 are turned off, a mute signal that is provided to the input terminal Tin1 is provided to the output terminal Tout1, the focus servo signal that is provided to the input terminal Tin2 is provided to the output terminal Tout2, and the voice coil motor control signal that is provided to the input terminal Tin3 is provided to the output terminal Tout3.

The output terminals Tout1 through Tout3 are connected to the driver 22, wherein the mute signal, focus servo signal and voice coil motor control signal are provided to the driver 22. The driver 22 controls a focus actuator 38 by the focus servo signal from the DSP 16 and controls a voice coil motor 39 by the voice coil motor control signal from the DSP 16. In addition, the operations of the driver 22 are controlled by the mute signal from the DSP 16.

As the power source voltage from the power source circuit 24 drops at time t1 and becomes lower than an appointed voltage, the control circuit 54 turns off the analog switches 55, 57 and 59, and turns on the analog switches 56 and 58, whereby an output signal of the voltage follower circuit 53 is provided to the driver 22 as a mute signal and a focus servo signal. A muting action of the driver 22 is cancelled by an output signal of the voltage follower circuit 53. Also, since the muting action is cancelled in the driver 22, the focus actuator 38 is driven by an output signal of the voltage follower circuit 53, and a retraction action in the focusing direction is carried out.

Further, as the time is delayed by the delay circuit 65 by an appointed duration of time at time t2, the analog switch 60 is turned on. When the analog switch 60 is turned on, an output signal of the voltage follower circuit 53 is provided into the driver 22. The driver 22 drives the voice coil motor 39 by the output signal of the voltage follower circuit 53. The voice coil motor 39 is driven in the outer circumferential direction of a disk by the output signal of the voltage follower circuit 53, wherein the movable head 200 is retracted to the outer circumferential portion. In addition, the movable head 200 is moved to the outer circumference of a disk in the present embodiment. However, since there is no facial sway on the inner circumferential side of a disk and there is no fear that the disk is brought into contact with the head, the movable head 200 may be retracted toward the inner circumferential side. Furthermore, a locking mechanism may be provided, which locks the movable head 200 at its retracted position, regardless of the outer circumferential side or the inner circumferential side, wherein, since the movable head 200 is locked at its retracted position by the locking mechanism after the retraction, it is possible to securely prevent the object lens from being brought into collision with a recording medium.

As described above, by employing an electric double-layer capacitor for the capacitor 51 that provides power to drive the retraction circuit 23, it is possible to provide a retraction circuit that can be used with almost no limitation with a short preparation time, and can permit a sufficient retraction current to flow.

Also, by carrying out a retraction action by both the focus actuator 38 and voice coil motor 39 when retracting the head, not only is it possible to prevent the object lens from being instantaneously subjected to a collision with an optical disk, which may occur when the power is interrupted, but also the movable head 20 can be retracted to a safe position. Next, it is possible to prevent the object lens from being brought into contact with an optical disk due to an impact from the outside until power is supplied.

Further, since the timing of retracting the voice coil motor 39 is delayed when carrying out a retraction action, power is totally concentrated at the focus actuator 38 to cause the lens to be radically separated from an optical disk, and next, the power is supplied to the voice coil motor 39 to move the movable head 200 to a safe position, wherein even if a facial sway of an optical disk occurs and an impact is applied from the outside, it is possible to prevent the object lens from being brought into contact with an optical disk, and a safe retraction action can be carried out.

Still further, in the present embodiment, although the focus actuator 38 and voice coil motor 39 are driven through the driver 22, these may be directly driven by electric charge accumulated in the capacitor 51. For example, the capacitor 51 is connected to the coil 205 of the focus actuator 38 when a retraction action is carried out, and electric charge accumulated in the capacitor 51 is provided to the coil 205 directly or via a current-limiting resistor, etc., thereby retracting the object lens 206. By carrying out operations similar thereto with respect to the voice coil motor 39, a retraction action in the tracking direction may be carried out.

Also, in a drive in which a recording medium is removable, if power is unexpectedly interrupted during operation, a voltage drop will be caused due to consumption of battery charge when being driven by the battery, whereby the recording medium may be left in the drive. In this state, the recording medium is maintained in a position opposed to the object lens. Therefore, the recording medium may be brought into collision with the object lens due to an impact and/or vibrations from the outside, wherein there may be a fear that the object lens is damaged. In particular, in a proximity recording and reproduction type drive in which the distance between a recording medium and the object lens becomes 1 mm or less, it is considered that a recording medium is frequently brought into contact with the object lens. Also, in a case where a user intentionally switches off the power source, or a user moves the drive in which a recording medium is left in the drive, the recording medium may be brought into collision with the object lens since these are subjected to vibrations.

In the present invention, retraction control is enabled, including the above-described case, and it is possible to prevent the object lens from being brought into collision with a recording medium. Therefore, an example according to the present embodiment becomes particularly effective with respect to a proximity recording/reproduction type drive in which the interval between the object lens and a recording medium becomes 1 mm or less.

Also, in the embodiment, a description is given of the case of an optical disk apparatus. However, the present embodiment is not limited to an optical disk apparatus, but may be effectively applied to an information recording apparatus, employing an optical head, such as an optical card, optical tape, etc.

What is claimed is:

1. An information storage apparatus including an object lens that is disposed so as to face a recording medium, and is used in recording information in said recording medium and/or reproducing information therefrom, and a head actuator for moving said object lens toward and away from said recording medium in a focus direction, further comprising:
   a capacitor electrically charged by a power source; and
   a driving processor for driving said head actuator with electric charge accumulated in said capacitor in accordance with the voltage of said power source, and for retracting said object lens to a position away from said recording medium.

2. The information storage apparatus as set forth in claim 1, including a second head actuator for moving said object lens along the surface of said recording medium, wherein said driving processor drives said second head actuator with power electrically accumulated in said capacitor.

3. The information storage apparatus as set forth in claim 2, wherein said driving processor drives said second head actuator with a delay of an appointed duration of time, after retracting said object lens from said recording medium.

4. An information storage apparatus, comprising:
   a head that is disposed so as to face a recording medium, and records information in said recording medium and/or reproduces information therefrom;
   a first actuator for moving said head toward and away from said recording medium;
   a second actuator for moving said head along the surface of said recording medium;
   a capacitor which is charged by a power source; and
   a driving processor for driving said first actuator with power electrically accumulated in said capacitor, retracting said head from said recording medium, further driving said second head actuator with a delay of an appointed duration of time, after retracting said head from said recording medium.

5. The information storage apparatus as set forth in claim 1, wherein said capacitor is a double-layer capacitor.

6. A method for operating an information storage apparatus including an object lens that is disposed so as to face a recording medium, and is used in recording information in said recording medium and/or reproducing information therefrom, and a head actuator for moving said object lens toward and away from said recording medium in a focus direction, wherein a capacitor is charged by a power source; and said head actuator is driven by power electrically accumulated in said capacitor when any trouble occurs, and said object lens is retracted in a direction moving away from said recording medium.

7. The method as set forth in claim 6, further including a second head actuator for moving said object lens along the surface of said recording medium, wherein said second head actuator is moved by power electrically accumulated in said capacitor.

8. The method as set forth in claim 7, wherein said second head actuator is moved with a delay of an appointed duration of time, after retracting said object lens from said recording medium.

9. In the method as set forth in claim 6, wherein said capacitor is a double-layer capacitor.

10. In an information storage apparatus including an object lens that is disposed so as to face a recording medium, and is used in recording information in said recording medium and/or reproducing information therefrom, a head actuator for moving said object lens toward and away from said recording medium, and a second head actuator for moving said object lens along the surface of said recording medium, a method for retracting the object lens comprising the steps of:

charging a capacitor by a power source; and driving said head actuator by power electrically accumulated in said capacitor, retracting said object lens from said recording medium, driving said second head actuator with a delay of an appointed duration of time, after retracting said object lens from said recording medium.

* * * * *